United States Patent [19]
Hehl et al.

[11] Patent Number: 5,700,104
[45] Date of Patent: Dec. 23, 1997

[54] SYSTEM OF FIXATING A SHAFT

[75] Inventors: Thomas Hehl, Bietigheim-Bissingen; Hans Prohaska, Rottenburg, both of Germany

[73] Assignee: ITT Automotive Europe GmbH, Germany

[21] Appl. No.: 742,275

[22] Filed: Oct. 31, 1996

Related U.S. Application Data

[63] Continuation of Ser. No. 367,345, filed as PCT/PE93/02299 Aug. 26, 1993 published as WO94/05532 Mar. 17, 1994, abandoned.

[30] Foreign Application Priority Data

Sep. 4, 1992 [DE] Germany .......................... 42 29 496.7

[51] Int. Cl.⁶ ....................................................... B25G 3/34
[52] U.S. Cl. ..................... 403/265; 403/268; 403/269; 29/898.054; 29/898.12
[58] Field of Search ........................... 403/265, 269, 403/267, 268; 29/898.054, 898.12, 898.04, 447, 451; 15/250.34, 264, 250; 425/451; 308/36.1

[56] References Cited

U.S. PATENT DOCUMENTS

| | | | |
|---|---|---|---|
| 3,804,576 | 4/1974 | Hehl | 425/451 |
| 3,845,998 | 11/1974 | McElhinney et al. | 307/36.1 |
| 4,550,469 | 11/1985 | Deutscher et al. | 15/250.34 |
| 4,682,937 | 7/1987 | Credle, Jr. | 417/393 |
| 4,716,617 | 1/1988 | Noack et al. | 15/250.34 |
| 5,265,456 | 11/1993 | Kennedy et al. | 29/447 X |
| 5,282,688 | 2/1994 | Kanezaki et al. | 29/898.054 X |
| 5,319,851 | 6/1994 | Ikezawa et al. | 29/898.054 X |

FOREIGN PATENT DOCUMENTS

| | | |
|---|---|---|
| 4028892 | 3/1992 | Germany . |
| 873525 | 7/1958 | United Kingdom . |

OTHER PUBLICATIONS

International Search Report for Application PCT/EP93/02299 filed Aug. 26, 1993.

*Primary Examiner*—Kenneth J. Dorner
*Assistant Examiner*—Bruce A. Lev
*Attorney, Agent, or Firm*—J. Gordon Lewis; Thomas N. Twomey

[57] ABSTRACT

A system for axially fixing a shaft, in its bearing casing in that the shaft portion surmounting the bearing casing is provided with an annular groove and in that a plastic material is injected around the annular groove.

8 Claims, 2 Drawing Sheets

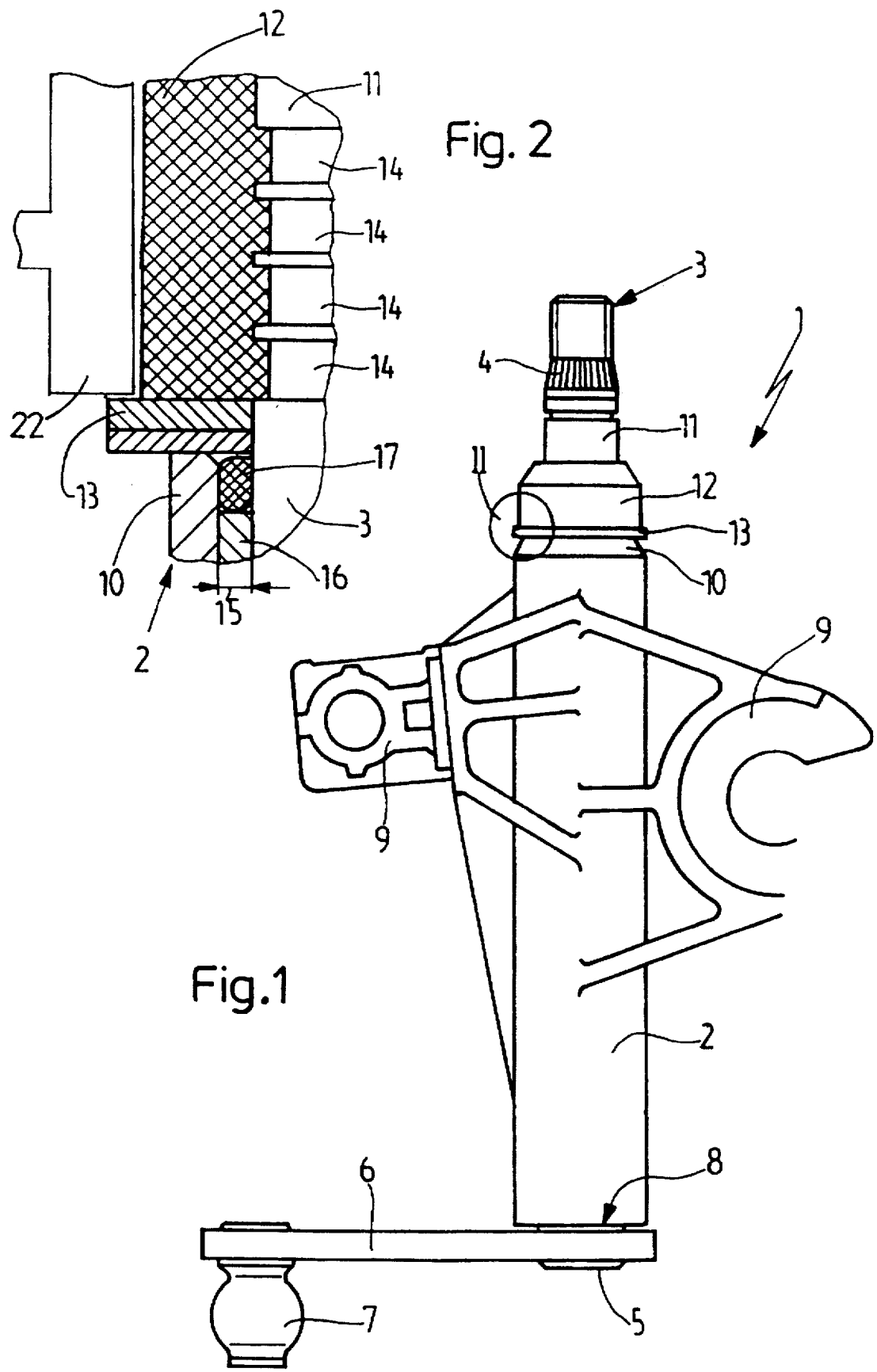

SYSTEM OF FIXATING A SHAFT

This application is a continuation of application Ser. No. 08/367,345 filed as PCT/PE93/02299 Aug. 26, 1993 publish as WO94/05532 Mar. 17, 1994 abandoned.

TECHNICAL FIELD

This invention relates to a system of fixing a shaft and more particularly relates to a system of fixing a shaft axially in its bearing casing in wiper installations. This invention besides relates to a wiper installation provided with a drive mechanism and with a linkage coupled with the drive mechanism, with the drive mechanism and/or the linkage being provided with at least one rotating or swinging shaft supported in a casing and with the shaft at least unilaterally rising above the casing by means of a shaft portion and with this shaft portion being provided with an annular groove.

BACKGROUND OF THE INVENTION

From German Patent Application (DE) No. 40 28 892 A1 a drive mechanism has become known which in particular is destined for windscreen wipers of automotive vehicles and which has a shaft projecting out of one front side of the bearing casing, with the shaft being provided with a radial groove. Further, there is an annular gap between the shaft and the bearing casing. Axial fixation of the shaft at the bearing casing is made by means of a bushing which is made of elastic plastic material and is firmly fitted to the bearing casing and is inserted into the annular gap. Moreover, the bushing is provided with a radially inwards projecting sealing flange engaging the annular groove of the shaft. This bushing replaces the otherwise usual retaining ring or C-ring which is inserted into the annular groove and by way of which the shaft is fixated at the bearing casing.

In the drive mechanism referred to at the beginning, the bore of the bearing casing, the diameter of the shaft, and the alignment of the shaft with respect to the bearing casing have to be exactly adjusted with regard to each other so that the high-precision-manufactured bushing can be inserted with a small play into the annular gap between the shaft and the bearing casing. If the play is rated too small, the bushing cannot be inserted any longer. In case of too large a play there exists the danger of humidity penetrating from the outside into the shaft bearing and causing damage. It will likewise be impossible to insert the bushing if the shaft is not coaxially aligned with respect to the bearing casing. With the shaft, for the purpose of inserting the bushing, being aligned under the action of a force, the bushing being inserted and subsequently the shaft-aligning force being removed, high pressures will form in parts between the shaft and the bushing, which pressures lead to increased wear which may result in premature operational failure.

It is thus an object of this invention to provide a method as well as a wiper installation assembly which allow the shaft to be axially supported in the bearing casing in an easy manner, it being the intention to reduce the danger of premature failure.

In the system referred to at the beginning, this object is solved according to this invention in that, after insertion and, possibly, after alignment of the shaft in its bearing casing, the annular groove is at least sectionally injection-moulded around with a plastified plastic material or metal.

In the inventive system, thus the shaft portion rising above the bearing casing is injection-moulded around with a plastified and curing material after the shaft has been inserted into the bearing casing. This plastified material may be either a plastic material or a metal. In this operation, the material penetrates into the annular groove of the shaft and, moreover, rests on the front-side end of the bearing casing. Thereby, the shaft is axially fixated with respect to the bearing casting. After curing or permanent hardening of the material the same serves as a bearing of the shaft as well as a seal against the penetration of dirt and humidity from the surroundings into the bearing and against leakage of lubricant from the bearing. The inventive system has the advantage that, for the purpose of forming an exactly defined annular gap, neither the bore of the bearing casing, nor the diameter of the shaft require high-precision manufacture with regard to their dimensions; moreover, it is possible to select the spacing of the radial groove of the shaft with regard to the front side of the bearing casing at will and, finally, it is not necessary to align the shaft coaxially with regard to the bore of the bearing casing. Moreover, no high-precision components like bushes to be inserted or the like are required for the axial fixation of the shaft. Manufacture of the inventive shaft fixation is easily and quickly implemented. Admittedly, as a rule, the shaft is aligned, i.e. centered, after its insertion into the bearing casing. This operation, however, is not necessary. Due to the injected material it is also possible to fixate the shaft in offset or tilted positions in the bearing casing. A further advantage of the inventive system is seen in that the internal shape of the bearing casing may also feature a conical design. This is of special advantage in case of cast casings. Further, there is no need for after treating the internal shape after the manufacture of the bearing casing, in particular so with regard to widening it to predetermined dimensions. In particular, no mechanical after treatment is required in case of bearing casings made from aluminum die-castings despite the considerable dimensional tolerances caused by the cooling of the bearing casing.

In order to achieve a defined play between the shaft and the cured plastic material or permanently hardened metal, respectively, the shaft is heated before injection moulding, in particular up to a temperature of 200° C. ±30° C. As after injection moulding curing or permanent hardening of the material will take place at a faster rate than cooling of the shaft, a defined play will be generated by the amount of shrinkage of the shaft. If the cooled material is desired to be tight-fitted on the shaft it will in such a case be possible to cool the shaft down to a temperature below the ambient temperature or rather below the operating temperature before the injection-moulding operation.

With advantage, the plastic material or metal, respectively, is injection-moulded axially and/or radially onto the shaft portion. Depending on the shape and accessibility of the shaft portion as well on its length and on respectively the plastic material or metal used, the same is injected onto the shaft portion either radially so that it is pressed to both sides or injection will be axial. Axial injection will be of particular advantage if the shaft portion is not, or only with great difficulties, accessible from the side.

In a further development it is provided to inject different plastic materials or metals onto the portion simultaneously or successively. In doing so, it is possible to use suitable materials, for instance, with regard to a low friction coefficient, a good sealing effect, a high-degree resistance against certain substances such as greases, oils, water or aggressive agents. By way of suitable feed openings, these materials may be injected onto the shaft portion in succession or simultaneously. In this way, a combination of the properties of the different materials is possible.

In order to prevent the plastic material or metal injected onto the shaft portion from emerging from the mould space the shaft portion will at least partially be embraced and/or overlapped by means of a tool during the injection-moulding operation so that a hollow space is formed between the tool and the shaft portion. This tool advantageously allows the plastified material to be diverted around the front side of the bearing casing so that the material will be anchored on the bearing casing, axial slip as well as rotating along in the circumferential direction being prevented.

Fixation of the plastic material or metal in the circumferential direction on the bearing casing is advantageously achieved in that the material is injected into recesses provided on the outside of the axial end of the bearing casing. These recesses can also have undercuts and in particular are designed like dovetails. Thereby, moreover, a further protection is procured against the penetration of dirt and humidity into the bearing of the shaft.

Preferably, the shaft is fixated with respect to the bearing casing by way of an additional tool until the plastic material or the metal will have cured or permanently hardened. Thereby, it will be ensured that the axial play in the shaft in the bearing casing will not exceed a certain amount.

In a further development, it is provided that the annular gap between the shaft and the bearing casing will be sealed at least during the injection-moulding operation. Thereby, the plastic material or the metal will be prevented from penetrating into the annular gap. Further, this sealing operation will keep the material to be injection-moulded around the shaft portion under pressure until it will have cured or permanently hardened. This will be a further tightness-improving achievement.

According to this invention, the above-defined object is solved in a wiper installation of the present invention in that the annular groove will at least sectionally be injection-moulded around with a plastic material or metal.

It is possible to reduce the friction between the shaft and respectively the plastic material or metal in an advantageous manner in that the material is provided with the addition of a lubricant. Such additions may be metallic additions, plastics or liquid additions.

In a preferred example of an embodiment, the shaft portion has several annular grooves, in particular four of them. The advantage of this arrangement is that the plurality of annular grooves will form a kind of labyrinth seal which, to a very large extent, will prevent dirt and humidity from penetrating into the bearing of the shaft. Further, because of the plurality of annular grooves, the axial force acting on the shaft will be distributed evenly and introduced over a large range into the material surrounding the annular grooves. Damage to the axial bearing of the shaft caused by axial force peaks will thus be prevented.

Preferably, the width of the annular grooves exceeds the width of the spacings between them. Consequently, the width of the sections of the material en gaging the annular grooves is likewise relatively large which will even further reduce loosening of these sections, particularly so in case of axial force peaks. This will be of special advantage if a plastic material is used, relatively thick-walled sections being formed in this way.

In particular in case of high-speed shafts any local temperature peaks caused by friction will be prevented in the axial bearing in that the annular groove has rounded internal edges. Thus, the material penetrating into the annular groove will be prevented from having sharp edges that may locally heat up excessively.

Penetration of material into the annular gap between the shaft and the bearing casing will advantageously be prevented in that this annular gap is sealed, for instance, by means of a washer embracing the shaft and resting on the front side of the bearing casing.

Danger of damage to the axial bearing is advantageously prevented in that the outside of the injected plastic material or metal is sloped towards the shaft end, particularly so in a conical manner. Moreover, this slope has the advantage that, because of the reduced mass, the axial bearing has a smaller play with regard to the shaft circumference in the area of the sloping end whereby a better sealing effect will be achieved.

With preference, the plastic material is a thermoplastic, in particular a polyamide such as polyamide 6/12, or a duroplastic and the metal is preferably a copper, lead and/or tin alloy. With a thermoplastic material being used, the same will be plastified by heating and will be injected around the shaft portion. Auxiliary tools will fixate the wiper shaft axially in respect of the bearing casing until the injected thermoplastic material or metal will have cooled and cured or permanently hardened. When using a duroplastic material the same will be activated, for instance, by means of the addition of a hardener and will be worked in plastic condition. The duroplastic material will set in particular by the application of heat and will fixate the shaft. Heat may be applied to the duroplastic material by means of a heated shaft, for instance.

Advantageously, when cured or permanently hardened, the plastic material or metal will provide an axial bearing and a sealing for the shaft. As already mentioned, no further components will be required for the bearing and sealing functions.

With preference in the area of the axial end of the bearing casing, the outside of the bearing casing is provided with recesses filled by the injection of respectively the plastic material or metal. These changes in the shape of the bearing casing provide anchoring points for the material so that, on the one hand, the same is firmly connected to the bearing casing and, on the other hand, the shaft is axially held rigidly by the plastic material or metal, respectively.

Another way of achieving an optimum sealing is to integrate, within respectively the plastic material or metal, additional seals such as O-rings or the like. In this case it is possible to use as plastic material, for instance, a material designed for an optimum sliding friction coefficient, an optimum sealing effect being achieved, for instance, by the O-ring injected, i.e., integrated into the plastic material. In this way it is possible to combine the properties of the O-ring with those of the plastic material.

In some embodiments the shaft is provided to be the driven shaft of a wiper motor. In another embodiment the shaft is that of a wiper bearing. In the first-mentioned embodiments, the bearing casing is the casing of the wiper motor or rather of its gear and, in the second-mentioned embodiment of the wiper bearing, the bearing casing is formed by the bearing bushing receiving the shaft.

BRIEF DESCRIPTION OF THE DRAWINGS

FIG. 1 is a side view of a wiper bearing.

FIG. 2 is an enlarged detail II as per FIG. 1.

DETAILED DESCRIPTION OF THE PREFERRED EMBODIMENTS

Figure 3:
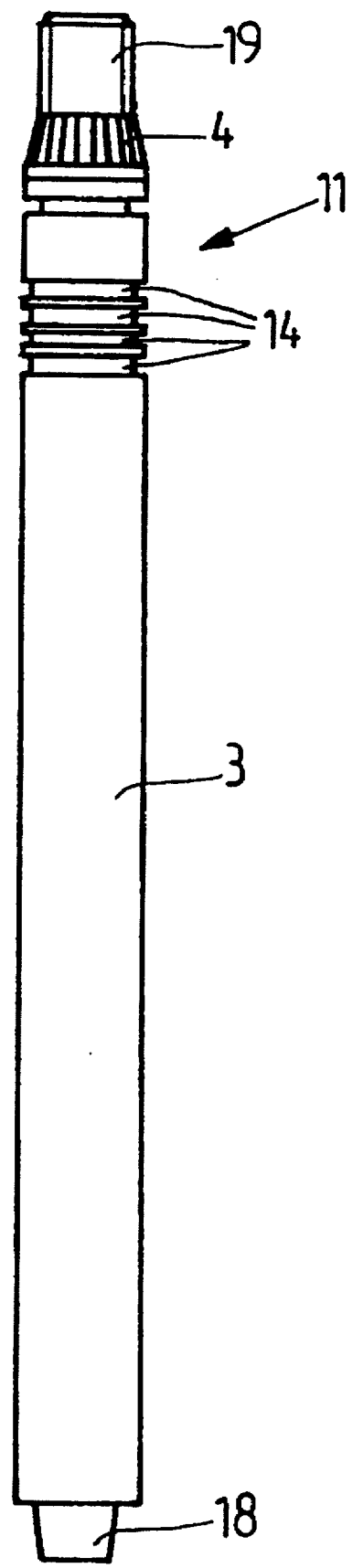
FIG. 3 is the wiper shaft of the wiper bearing as per FIG. 1.

FIG. 1 represents a wiper bearing the whole of which is referred to by numeral 1 and where, in a bearing casing 2, a wiper shaft 3 is fixed so as to be able to rotate or pendulate. At the end 5 of the wiper shaft 3 which is opposite a knurled cone 4, a crank 6 with a pressed-on ball pin 7 is arranged for force transmission or rather for the transmission of the swinging motion. A washer 8 is inserted between the crank 6 and the front-side lower end of the bearing casing 2. By way of this washer 8, it is possible to adjust the longitudinal play of the wiper shaft 3 in the bearing casing 2 to be 0.3 mm at the maximum, for instance. With preference, the wiper shaft 3 is supported by the washer 8 in the axial direction in a slightly resilient manner. For the rest, the bearing casing 2 has fastening devices 9 for being fixed, for example, to the body of an automotive vehicle.

Wiper shaft 3 rises above the bearing casing 2 on the upper front-side end 10 by means of a shaft portion 11 which sectionally is injection-moulded around by a plastic material 12 or a metal. The plastic material 12 may be formed with an end 21 sloped toward the shaft end. One or several washers 13 are inserted between the upper front-side end 10 and the plastic material 12. The wiper shaft 3 is axially fixated in the bearing casing 2 by way of the plastic material 12 embracing shaft portion 11.

FIG. 2 shows detail II of FIG. 1 on an enlarged scale. There, it is discernible that the shaft portion 11 is provided with four annular grooves 14 arranged one behind the other. The lower annular groove 14 advantageously is flush with the surface of the top washer 13. The plastic material 12 injected around the shaft portion 11 lies flush on the surface of the top washer 13 and engages annular grooves 14. An optimum type of anchoring the shaft portion 11 in the plastic material 12 is achieved in that the annular grooves have a large width with regard to their mutual spacings. The part of the plastic material 12 which engages the annular grooves 14 therefore likewise has a large width so that also extremely high axial forces may be transmitted from the wiper shaft 3 to the plastic material 12 without there existing any fear of failure caused by loosening.

In FIG. 2, it is further discernible that the washers 13 rest on the upper front-side end 10 of the bearing casing 2 and that an annular gap 15 is provided between the bearing casing 2 and the shaft 3. A bearing bushing 16 for the support of the wiper shaft 3 as well as a sealing ring 17 are arranged in said annular gap. Tool 22 is shown as during injection, partially embracing and/or overlapping shaft 3 to advantageously allow plastified material to form about the shaft while preventing the material from emerging from the mould space.

FIG. 3 represents the wiper shaft 3 of FIG. 1 before being assembled in the bearing casing 2. Discernible is the receiving pivot 18 at the lower end of the wiper shaft 3 which the crank 6 is riveted to. Further, the annular grooves 14 at the upper shaft portion 11 can be seen which will surmount the bearing casing 2 when the wiper shaft 3 has been assembled. At last, there are represented the knurled cone 4 and the screw thread 19 for receiving and fixating a fastening component of a wiper arm.

The drawing shows one example of an embodiment where a wiper shaft 3 is axially fixated in a bearing casing 2 by way of a plastic material 12. However, this invention is not to be limited thereto but rather shafts of drive mechanisms and their axial fixations, respectively, are also to come within the scope of the patent.

We claim:

1. A method of fixating a shaft axially in its bearing casing in wiper installations, said shaft having a portion which axially projects from an axial end of the bearing casing wherein said axially projecting portion includes an annular groove, comprising the steps of:

inserting and aligning the shaft in its bearing casing, and molding plastic or metal around said annular groove wherein the shaft is heated to 200° C. ±30° C. prior to injection molding.

2. A method as claimed in claim 1 wherein the plastic material or the metal, respectively, is injected onto the portion.

3. A method as claimed in claim 2, wherein different plastic materials or metals are injected onto the portion simultaneously or in succession.

4. A method as claimed in claim 3, wherein during injection moulding, the portion is at least partially embraced and/or overlapped by means of a tool so that a hollow space is formed between the tool and the portion.

5. A method as claimed in claim 4, wherein, the plastic material or the metal, is at least partially injected around the axial end of the bearing casing.

6. A method as claimed in claim 2, wherein the annular gap existing between the shaft and the bearing casing is sealed at least during the molding step.

7. A method as claimed in claim 1, wherein the plastic material or the metal, is injected into recesses provided on the outside of the axial end of the bearing casing.

8. A method as claimed in claim 1, wherein the shaft is fixated by means of an additional tool with regard to the bearing casing until respectively the plastic material or metal has cured or permanently hardened.

* * * * *